Jan. 4, 1927.　　　　　　　　　　　　　　　　1,613,483
I. D. RICHHEIMER
COFFEE MAKER
Filed April 9, 1926
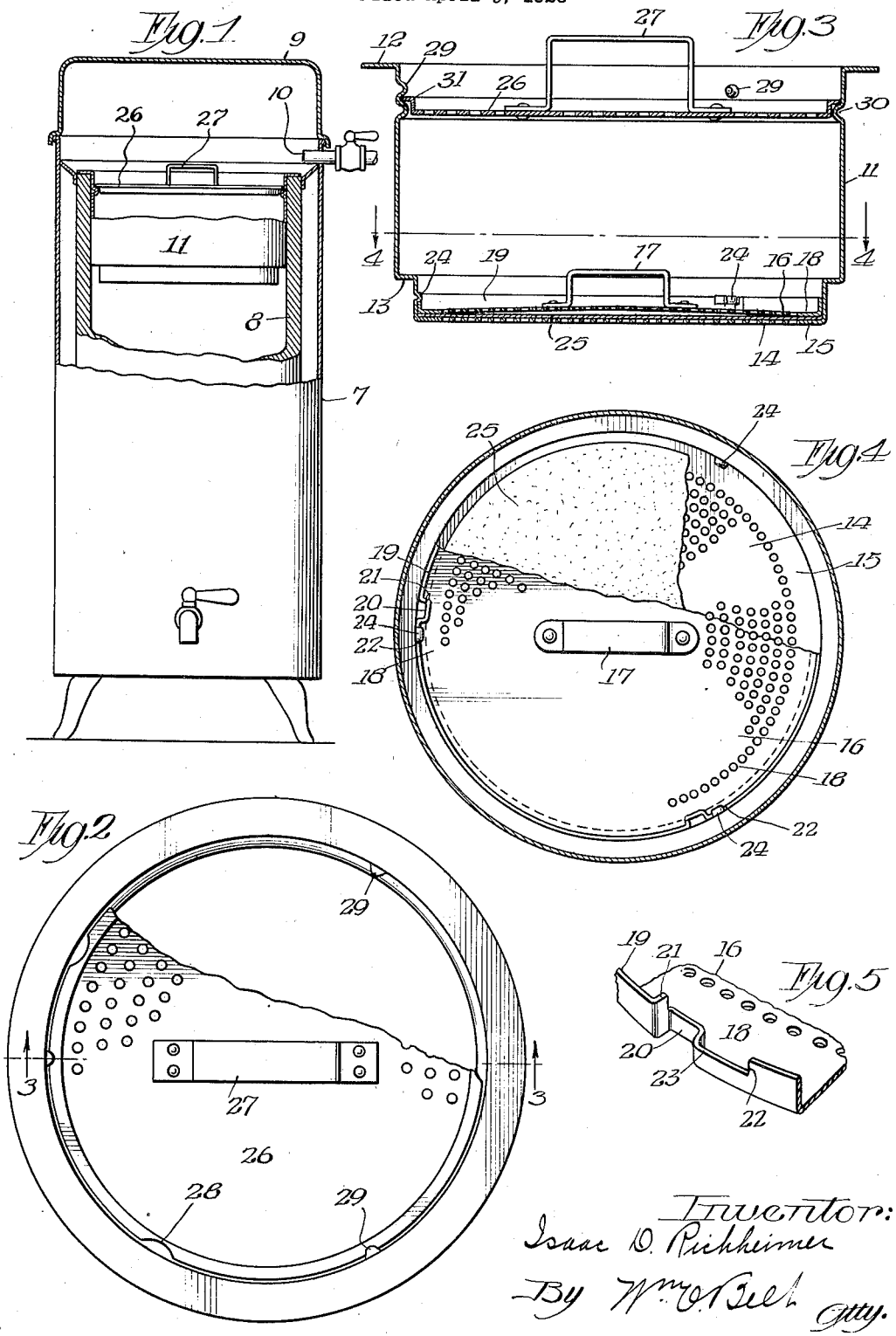

Patented Jan. 4, 1927.

1,613,483

UNITED STATES PATENT OFFICE.

ISAAC D. RICHHEIMER, OF NEW YORK, N. Y.

COFFEE MAKER.

Application filed April 9, 1926. Serial No. 100,793.

This invention relates to coffee makers and more particularly to an improved receptacle for holding the ground coffee in the urn or pot during the filtration operation.

The objects of the invention are to provide an improved coffee receptacle which can be easily inserted in and removed from the urn or pot, which is adapted to be easily prepared for receiving the ground coffee and the water, and which comprises comparatively few parts which are easily assembled and disassembled; to provide for the free flow of water through the ground coffee and the receptacle; to permit the ground coffee to loosen up and float in the receptacle and to prevent it from packing in the receptacle during the filtration operation; to provide improved means for securing the filter medium in the bottom of the receptacle without damage to the medium and for holding this medium in proper place during the filtration operation; and to improve the construction and arrangement of parts so as to facilitate the operations of making coffee and of cleansing the urn or pot.

In the accompanying drawings I have illustrated the invention in a selected embodiment as applied to an urn, and referring thereto:

Fig. 1 is an elevation of the urn, partly broken away and in section to better disclose the invention.

Fig. 2 is a top plan view of the receptacle removed from the urn.

Fig. 3 is a sectional view on the line 3—3 of Fig. 2.

Fig. 4 is a sectional view on the line 4—4 of Fig. 3.

Fig. 5 is a detail perspective view.

Referring to the drawings 7 designates an urn which is provided with a crock 8, a cover 9 and a water inlet pipe 10. I have not shown all the structural details of the urn because they are generally familiar, they vary more or less, and they are not necessary to an understanding of the invention. The receptacle 11 for the coffee grounds has a flange 12 adapted to engage the top of the crock 8 to support the receptacle in the crock. The receptacle may also have a peripheral shoulder 13 to engage the top of a crock for supporting the receptacle on a crock. When the receptacle is made for a coffee pot it may be supported by a flange within the pot or by a shoulder on the pot just as in the case of the urn. The bottom 14 of the receptacle is perforated, preferably in a regular arrangement of perforations which, however, do not extend to the edge of the bottom but terminate at a distance therefrom leaving a flat imperforate rim 15 about the perforated central part of the bottom. A binder plate 16 having a handle 17 is arranged within the receptacle upon the bottom thereof. This binder plate is perforated like the bottom 14, and the perforations in the binder plate are made so that they can be registered with the perforations in the bottom. The binder plate also has a flat imperforate rim 18 outside the perforated portion thereof to register with the rim 15 on the bottom. An upturned flange 19 is provided at the margin of the binder plate and this flange has an indentation 20 (Fig. 5) and shoulders 21 and 22. Between the shoulders the flange is cut down at 23 to reduce its height. Projections 24 are provided on the inside of the receptacle adjacent the bottom thereof to engage indentations 20 on the binder plate. I may provide one or a plurality of these projections 24 and one or a plurality of indentations 20 to receive said projections. I have indicated in the drawings that three of these projections and three indentations are used and this is a satisfactory construction. The binder plate is adapted to be inserted snugly in a receptacle, at the bottom thereof, the indentations 20 permitting the binder plate to pass the projections. The projections are located sufficiently above the bottom so that when the binder plate is arranged in place in the receptacle it may be turned slightly to the right until the projection 24 engages the shoulder 22, which will limit the turning movement. In this movement the cutaway portion of the flange 19 travels under the projection and it is cut down to a proper height for this purpose. This construction enables me to make the binder plate so that the upturned flange 19 will fit snugly against the side wall of the receptacle adjacent to the bottom thereof and prevent the passage of ground coffee.

A filter paper or filter cloth or other filter medium 25 is clamped by the binder plate upon the bottom of the receptacle. The filter medium is preferably made of a size to overlap the flat rim 15 of the bottom of the receptacle and underlap the flat rim 18 of the binder plate. These rims are preferably made imperforate so that they will firmly clamp the filter medium and so that the binder plate may travel gently over the filter medium in its turning movement without damaging the medium. I also prefer to crown the binder plate slightly within the rim 18 to avoid any tendency of the binder plate to damage the filter medium. It is not desirable to crown this binder plate much because I wish to have the filter medium firmly held between the bottom of the receptacle and the binder plate during the filtration operation and at this time it would be quite satisfactory if the weight of the ground coffee and the water in the receptacle flattens the binder plate out to temporarily eliminate the crown.

A spreader plate 26 having a handle 27 is arranged in the receptacle as near the top thereof as practicable. This spreader is perforated and its marginal edge is provided with one or more recesses 28 to receive the projections 29 on the side wall of the receptacle. The spreader rests upon a corrugation 30 in the side wall of the receptacle and it engages the projections 29 so that by grasping the handle 27 the receptacle can be carried in the hand and inserted in the urn or removed therefrom. To strengthen the marginal edge of the spreader I provide it with an angle flange 31 and the spreader is preferably of sufficient size to fit snugly in the receptacle.

In practice the receptacle may be suspended within the top of the crock and below the water pipe 10, as shown in Fig. 1. Before or after arranging the receptacle in the urn the filter medium is spread evenly upon the bottom of the receptacle, the binder plate is arranged in place upon the filter medium and turned to locked position; the ground coffee is placed in the receptacle upon the binder plate and filter medium and should be spread evenly throughout the receptacle. Then the spreader is properly arranged within the receptacle and if the receptacle has been prepared away from the urn, it is then placed in the urn and the boiling water is admitted. The water is distributed by the spreader over the mass of ground coffee in the receptacle and passage of the water through the receptacle is retarded by the filter medium so that the water will back up in the receptacle and loosen up the mass of ground coffee and cause it to float more or less freely within the receptacle. It is for this reason I desire to take advantage of the full capacity of the receptacle because it is desirable that the ground coffee should be freely suspended in the water in the receptacle. This promotes the filtration operation and also produces a clear and superior coffee infusion. Of course it will be understood that the degree to which the coffee is suspended in the water in the receptacle will depend considerably upon the size of the receptacle, the quantity of ground coffee and the quantity of water; but it is my desire that under all conditions there should be a free percolation of the water and to a reasonable extent at least a suspension of the ground coffee in the water, for this will promote the efficiency of the filtration operation and produce a desirable infusion.

The construction of the receptacle is such that it can be easily handled and prepared for an infusion; it comprises but few parts, and these parts can be assembled easily and quickly for use and disassembled easily and quickly for cleansing purposes; and the construction is also such that the parts may be easily cleaned and kept at all times in a sanitary condition. I prefer to make the perforations in the binder plate so that they will register with the perforations in the bottom of the receptacle when the binder plate is in locked position with the shoulder 22 in engagement with the projection 24 thereby providing continuous passage for the liquid coffee through the perforations and intercepted only by the filter medium. This provides for a comparatively free flow of the liquid coffee and a rapid filtration operation.

I have described the invention as used for making coffee, but it may be used in various forms for making tea and I would have it understood that I do not restrict myself to the use of the invention for making coffee, but intend by the general term "coffee maker" to include the use of the invention for making tea or for producing an infusion from other materials.

Changes in the construction and arrangement and proportion of parts of my invention may be desirable to adapt it for urns and pots and other receptacles with which the invention may be used and I reserve the right to make all such changes as fairly fall within the scope of the following claims.

I claim:

1. A coffee maker comprising a receptacle having a perforated bottom, a filter medium on said bottom, a perforated binder plate arranged within the receptacle upon the filter medium, and means for positioning and locking the binder plate with its perforations in registration with the perforations in said bottom.

2. A coffee maker comprising a receptacle having a perforated bottom, a filter medium on said bottom, a perforated binder plate arranged within the receptacle upon the filter medium, interlocking means on the binder plate and bottom, said binder plate being rotatable within said receptacle, and means for limiting the rotative movement of the binder plate to register the perforations therein with the perforations in said bottom.

3. A coffee maker comprising a receptacle, the bottom of said receptacle having a plurality of perforations surrounded by an imperforate rim, a filter medium spread on said bottom and having its margin overlapping said rim, a binder plate arranged within the receptacle upon the filter medium, interlocking means on the binder plate and bottom, said binder plate having an imperforate rim corresponding with the rim on said bottom, and a plurality of perforations within said rim.

4. A coffee maker comprising a receptacle having a perforated bottom, a perforated binder plate arranged within the receptacle adjacent said bottom, said bottom and said binder plate having flat imperforate rims at their outer edges, and a filter medium between the bottom and the binder plate and having its marginal portion engaged between said flat imperforate rims, said bottom and binder plate having interlocking means.

5. A coffee maker comprising a receptacle having a flat perforate bottom, a filter medium on said bottom, and a perforated binder plate arranged within the receptacle upon the filter medium, said binder plate being crowned slightly within its marginal portion.

6. A coffee maker comprising a receptacle having a perforated bottom, a filter medium on said bottom, a perforated binder plate arranged within the receptacle upon the filter medium, said receptacle having inward projections and said binder plate having an upstanding marginal flange recessed to receive said projections and cut down to permit rotative movement of said binder plate, and a shoulder at the end of the cut down portion of the flange to engage the projection and limit said rotative movement.

7. A coffee maker comprising a receptacle having a corrugation in its side wall adjacent the top thereof, projections in the side wall of the receptacle above said corrugation, a perforated spreader plate arranged to fit within the receptacle upon said corrugation and beneath said projections, the marginal edge portion of said spreader plate being bent to form a right angle flange and said flange being recessed to clear said projections.

ISAAC D. RICHHEIMER.